(12) United States Patent
Furuta

(10) Patent No.: US 10,580,553 B2
(45) Date of Patent: Mar. 3, 2020

(54) CABLE

(71) Applicant: FANUC CORPORATION, Yamanashi (JP)

(72) Inventor: Tomoyuki Furuta, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/249,994

(22) Filed: Jan. 17, 2019

(65) Prior Publication Data

US 2019/0228880 A1 Jul. 25, 2019

(30) Foreign Application Priority Data

Jan. 19, 2018 (JP) .................. 2018-007272

(51) Int. Cl.
*H01B 7/30* (2006.01)
*H01B 7/02* (2006.01)
*H01B 7/28* (2006.01)

(52) U.S. Cl.
CPC ................. *H01B 7/30* (2013.01); *H01B 7/02* (2013.01); *H01B 7/28* (2013.01)

(58) Field of Classification Search
CPC .................................... H01B 7/30; H01B 7/02
USPC .......................................................... 174/24
See application file for complete search history.

(56) References Cited

U.S. PATENT DOCUMENTS

| | | | |
|---|---|---|---|
| 2,708,176 A | 5/1955 | Rhodes | |
| 3,483,313 A | 12/1969 | Schaffhauser | |
| 4,385,021 A | 5/1983 | Neeley | |
| 4,804,020 A * | 2/1989 | Bartholomew | B29C 65/58 138/111 |
| 5,304,739 A | 4/1994 | Klug et al. | |
| 2003/0021633 A1* | 1/2003 | Seto | G02B 6/502 405/174 |
| 2006/0219668 A1 | 10/2006 | Kawahara et al. | |
| 2017/0361789 A1 | 12/2017 | Ohgushi et al. | |
| 2018/0286537 A1 | 10/2018 | Horiuchi | |

FOREIGN PATENT DOCUMENTS

| | | |
|---|---|---|
| CA | 2186336 A1 | 5/1997 |
| DE | 1127420 B | 4/1962 |
| EP | 0774816 A2 | 5/1997 |
| FR | 761000 A | 3/1934 |
| JP | 54139085 A | 10/1979 |

(Continued)

OTHER PUBLICATIONS

Partial English Machine Translation for German Publication No. 1127420 B, published Apr. 12, 1962, 5 pgs.

(Continued)

*Primary Examiner* — Timothy J Thompson
*Assistant Examiner* — Charles Pizzuto
(74) *Attorney, Agent, or Firm* — Fredrikson & Byron, P.A.

(57) ABSTRACT

A cable includes: a linear conductor; a plurality of resin hollow tubes which are disposed around the conductor so that an air layer is formed around the conductor and which extend in a longitudinal direction of the conductor; an insulating protective member configured to protect the conductor and the plurality of hollow tube; and a partitioning portion provided in at least one hollow tube among the plurality of hollow tubes, the partitioning portion being configured to partition an interior of the hollow tube.

16 Claims, 10 Drawing Sheets

(56) References Cited

FOREIGN PATENT DOCUMENTS

| JP | 59148210 A | 8/1984 |
|---|---|---|
| JP | 2131211 U | 10/1990 |
| JP | 3219505 A | 9/1991 |
| JP | 719913 U | 4/1995 |
| JP | 1034445 A | 2/1998 |
| JP | 2005294209 A | 10/2005 |
| JP | 2006281395 A | 10/2006 |
| JP | 2011198644 A | 10/2011 |
| JP | 2012507128 A | 3/2012 |
| JP | 2017135931 A | 8/2017 |
| JP | 2017228506 A | 12/2017 |
| WO | 8902646 A1 | 3/1989 |

OTHER PUBLICATIONS

Partial English Machine Translation for French Publication No. 761000 A, published Mar. 7, 1934, 4 pgs.
English Abstract for European Publication No. 0774816 A2, published May 21, 1997, 1 pg.
English Machine Translation for Japanese Publication No. 03-219505 A, published Sep. 26, 1991, 4 pgs.
Extended European Search Report for European Patent Application No. 19152444.6, dated Apr. 30, 2019, 16 pgs.
English Abstract for Japanese Publication No. 2006-281395 A, published Oct. 19, 2006, 2 pgs.
English Abstract and Machine Translation for Japanese Publication No. 2017-135931 A, published Aug. 3, 2017, 24 pgs.
English Abstract and Machine Translation for Japanese Publication No. 2011-198644 A, published Oct. 6, 2011, 10 pgs.
English Abstract and Machine Translation for Japanese Publication No. 2005-294209 A, published Oct. 20, 2005, 8 pgs.
English Machine Translation for Japanese Publication No. 07-019913 U, published Apr. 7, 1995, 5 pgs.
English Machine Translation of Japanese Publication No. S59-148210 A, published Aug. 24, 1984, 5 pgs.
English Machine Translation of Japanese Publication No. 2012-507128 A, published Mar. 22, 2012, 7 pgs.
Partial English Machine Translation of Japanese Publication No. H02-131211 U, published Oct. 31, 1990, 1 pg (including English Machine Translation of Notice of Reasons for Refusal mailed by Japan Patent Office for Application No. 2018-007269, dated Nov. 12, 2019, 5 pgs, citing Japanese Publication No. JPH02-131211 U).
English Abstract and Machine Translation of Japanese Publication No. H10-034445 A, published Oct. 2, 1998, 17 pgs.
English Abstract and Machine Translation for Japanese Publication No. 2017-228506 A, published Dec. 28, 2017, 20 pgs.
English Machine Translation for Japanese Publication No. S54-139085 A, published Oct. 29, 1979, 3 pgs.
U.S. Appl. No. 16/250,319, Non-Final Office Action dated Oct. 29, 2019, 30 pgs.

\* cited by examiner

CABLE

CROSS-REFERENCE TO RELATED APPLICATION

This application is based upon and claims the benefit of priority from Japanese Patent Application No. 2018-007272 filed on Jan. 19, 2018, the contents of which are incorporated herein by reference.

BACKGROUND OF THE INVENTION

Field of the Invention

The present invention relates to a cable employed for a wire electrical discharge machine, for example.

Description of the Related Art

A wire electrical discharge machine is disclosed which includes a work pan in which a dielectric working fluid is stored, a table which is provided in the work pan and on which a workpiece is placed, and a voltage application device for applying a voltage between a wire and the table (refer to Japanese Laid-Open Patent Publication No. 2006-281395).

SUMMARY OF THE INVENTION

In the wire electrical discharge machine described in Japanese Laid-Open Patent Publication No. 2006-281395, a cable for application of voltage may be immersed in the working fluid. In this case, the conductor of the cable and the table at the ground potential are electrostatically coupled through the working fluid and then leakage of electricity from the cable is likely to occur. In particular, in the case of a dielectric working fluid mainly containing water, alternating current (AC) voltage is applied so as to avoid corrosion of the workpiece. In general, the frequency is increased even up to several megahertz, as the surface roughness after processed in the finishing work becomes finer. As the frequency becomes higher, the influence of leakage due to electrostatic coupling becomes worse, and the peak value of the AC machining voltage becomes smaller as the surface area of the cable in contact with the working fluid becomes larger, resulting in unstable discharge.

It may be suggested that a member with a low relative permittivity be provided around the conductor so as to suppress leakage from the cable. However, even when fluororesin, having a generally low permittivity, for example, is employed as the low relative permittivity member, there is a concern that it will be difficult to reduce the capacitance occurring between the conductor and working fluid to such an extent that the leakage from the cable can be practically suppressed.

Accordingly, an object of the present invention is to provide a cable capable of considerably reducing capacitance occurring with a conductor.

A cable according to an aspect of the present invention includes: a linear conductor; a plurality of hollow tubes made of resin and which are disposed around the conductor so that an air layer is formed around the conductor, the hollow tubes extending in a longitudinal direction of the conductor; an insulating protective member configured to protect the conductor and the plurality of hollow tubes; and a partitioning portion provided in at least one hollow tube among the plurality of hollow tubes, the partitioning portion being configured to partition an interior of the hollow tube.

According to the cable of the aspect above, the plurality of hollow tubes form an air layer around the conductor, and therefore the capacitance occurring with the conductor is considerably reduced. Further, the partitioning portion is provided in the hollow tube to partition the interior of the hollow tube, and thus, even when the cable is immersed in a dielectric working fluid stored in a work pan of a wire electrical discharge machine, it is possible to prevent the working fluid from running inside the hollow tubes.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The cable of the present invention will be described in detail below in conjunction with preferred embodiments while referring to the accompanying drawings.

Embodiment

Figure 1:
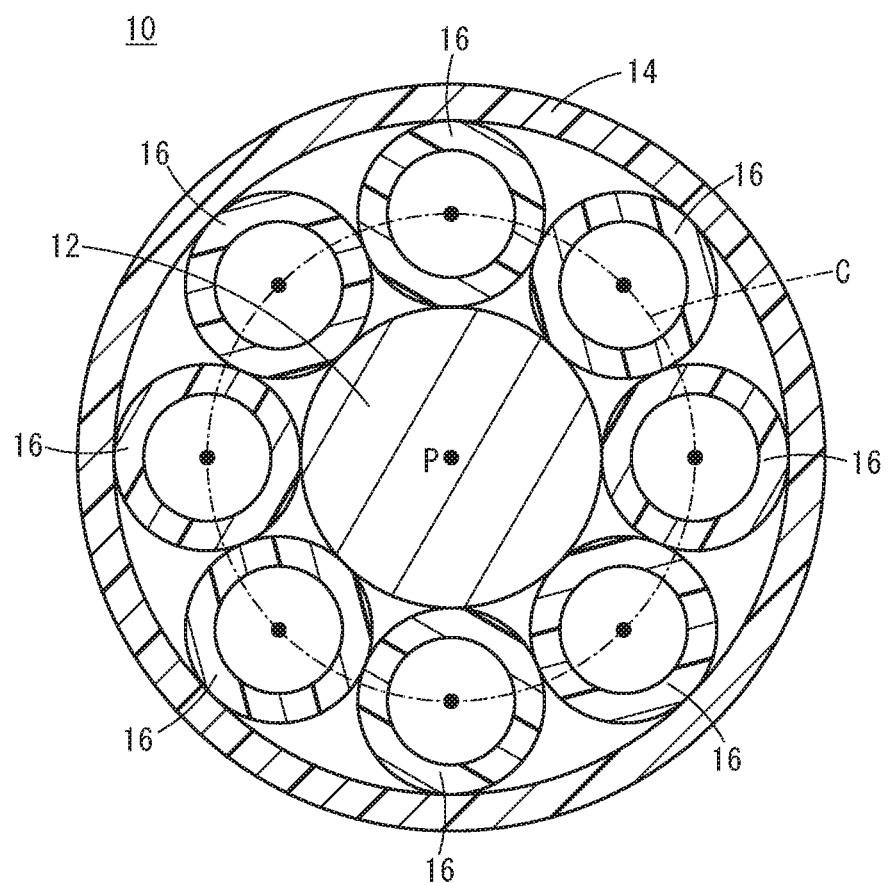
FIG. 1 is a schematic diagram showing a cross section of a cable according to an embodiment, which is taken along a direction orthogonal to its longitudinal direction.

FIG. 1 is a schematic diagram showing a cross section of a cable 10 of an embodiment. FIG. 1 shows a cross section of the cable 10 taken along a direction orthogonal to its longitudinal direction. The cable 10 of this embodiment is employed as a feeding cable for supplying electric power to a wire of a wire electrical discharge machine, or as a signal cable for measuring voltage applied to a wire of a wire electrical discharge machine. The cable 10 is placed in the interior of a work pan. The cable 10 mainly includes a conductor 12, a protective member 14, and a plurality of hollow tubes 16.

The conductor 12 is a transmission path on which power or signal is transmitted, and the conductor 12 is in the form of a line (a linear form). The external shape of the cross section of the conductor 12 in the direction orthogonal to the longitudinal direction is circular in FIG. 1, but it can be other shape.

The protective member 14 is an insulating member for protecting the conductor 12 and the plurality of hollow tubes 16. In this embodiment, the protective member 14 has a tubular form, and is disposed so as to surround the plurality of hollow tubes 16. Examples of material for making the protective member 14 include rubber, resin, etc., for example.

The plurality of hollow tubes 16 are tubes made of resin and which are arranged around the conductor 12 such that an air layer is formed around the conductor 12, and the plurality of hollow tubes 16 linearly extend along the longitudinal direction of the conductor 12. Examples of resin for making the hollow tubes 16 include silicone resin chiefly containing silicon, for example.

In this embodiment, the air layer formed around the conductor 12 by the plurality of hollow tubes 16 includes the interiors of the hollow tubes 16 and the gaps outside the hollow tubes 16. In this embodiment, each hollow tube 16 is in contact with the outer circumferential surface of the conductor 12 and the inner circumferential surface of the tubular protective member 14, and adjacent ones of the plurality of hollow tubes 16 are in contact with each other. Accordingly, the gaps outside the hollow tubes 16 include the portions surrounded by the outer circumferential surfaces of the hollow tubes 16 and the outer circumferential surface of the conductor 12 and the portions surrounded by the outer circumferential surfaces of the hollow tubes 16 and the inner circumferential surface of the tubular protective member 14.

In the cross section of the cable 10 taken along the direction orthogonal to the longitudinal direction, the outer peripheral shape and the inner peripheral shape of the hollow tubes 16 are substantially circular, and the plurality of hollow tubes 16 have substantially the same outer diameter and inner diameter. Also, in the cross section of the cable 10 taken along the direction orthogonal to the longitudinal direction, the center position of the circle C passing through the center positions of the respective hollow tubes 16 substantially coincides with the center position P of the conductor 12.

Figure 2:
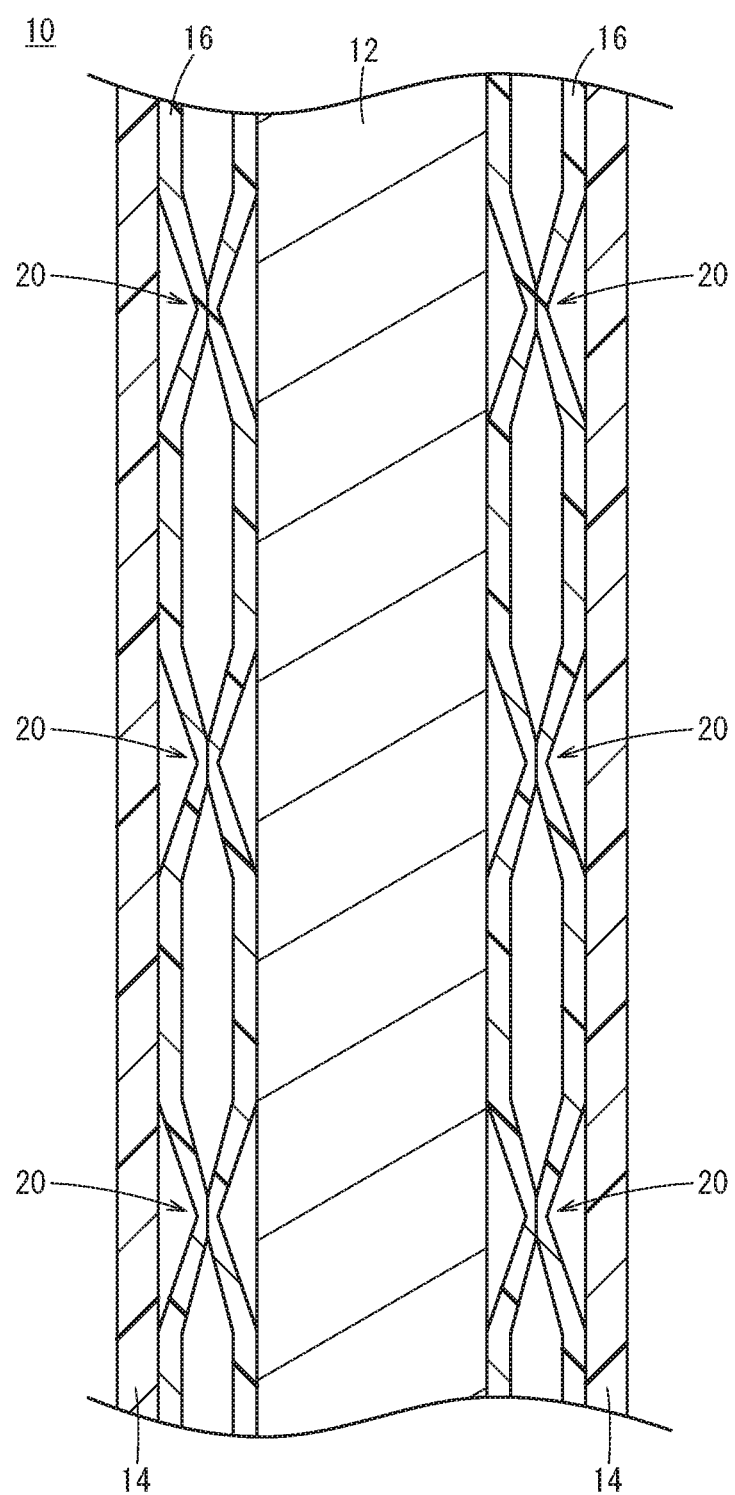
FIG. 2 is a schematic diagram showing a cross section in the longitudinal direction of the cable according to the embodiment.

FIG. 2 is a schematic diagram showing a cross section in the longitudinal direction of the cable 10. Each hollow tube 16 is provided with partitioning portions 20 for partitioning the interior of the hollow tube 16. A plurality of partitioning portions 20 are spaced at intervals in the longitudinal direction of the hollow tube 16. The intervals between the partitioning portions 20 may be equal to each other, or may be different from each other.

Each partitioning portion 20 is formed by squashing (pressing) the hollow tube 16 so that the inner circumferential surface of the hollow tube 16 joins together. Since the hollow tube 16 has been squashed or pressed, the outer circumferential surface portions of the hollow tube 16 at the partitioning portions 20 are positioned more inward than the outer circumferential surface portions of the hollow tube 16 in areas other than the partitioning portions 20.

As described above, the cable 10 of this embodiment includes the plurality of hollow tubes 16, and the hollow tubes 16 form an air layer around the conductor 12. Accordingly, even when the cable 10 is immersed in a dielectric working fluid stored in a work pan of a wire electrical discharge machine, the capacitance occurring between the working fluid and the conductor 12 can be considerably reduced. As a result, the cable 10 becomes less likely to leak electricity through the working fluid.

Furthermore, adjacent ones of the plurality of hollow tubes 16 are in contact with each other, so that the tubular protective member 14 is prevented from coming in contact with the conductor 12 even when the cable 10 is pressed. Thus, even when the cable 10 is immersed in the working fluid in a pressed state, the capacitance occurring between the working fluid and the conductor 12 can be considerably reduced.

Each hollow tube 16 of the embodiment has the partitioning portions 20 which partition the interior of the hollow tube 16. Accordingly, even when the working fluid stored in a work pan of a wire electrical discharge machine enters the interior of the hollow tube 16, the partitioning portions 20 prevent the working fluid from flowing further into the interior thereof.

Furthermore, the outer circumferential surface portions of the hollow tube 16 at the partitioning portions 20 are positioned more inward than the outer circumferential surface portions of the hollow tube 16 in areas other than the partitioning portions 20. Accordingly, gaps are formed on the outer circumferential side of the hollow tube 16 at the partitioning portions 20, and the formation of the gaps increases the proportion of vacancy inside the tubular protective member 14. This further reduces the capacitance occurring with the conductor 12.

MODIFICATIONS

The above embodiment has been described as an example of the present invention, but the technical scope of the present invention is not limited to the scope described in the embodiment above. Various modifications and improvements can of course be applied to the above-described embodiment. It is clear from the description of claims that embodiments modified or improved in various ways are included in the technical scope of the present invention.

Some of modified or improved embodiments will be described below as modifications. Constituent elements that are equivalent to those described in the embodiment above will be labeled using the same reference numerals, and overlapping descriptions thereof will not be repeated.

Modification 1

In the above-described embodiment, the partitioning portions 20 are formed by squashing (pressing) the hollow tube 16 so that its inner circumferential surface joins together. However, as shown in FIG. 3, the partitioning portions 20 may be formed to partition the interior of the hollow tube 16 without deforming the inner circumferential surface and the outer circumferential surface of the hollow tube 16.

Figure 3:
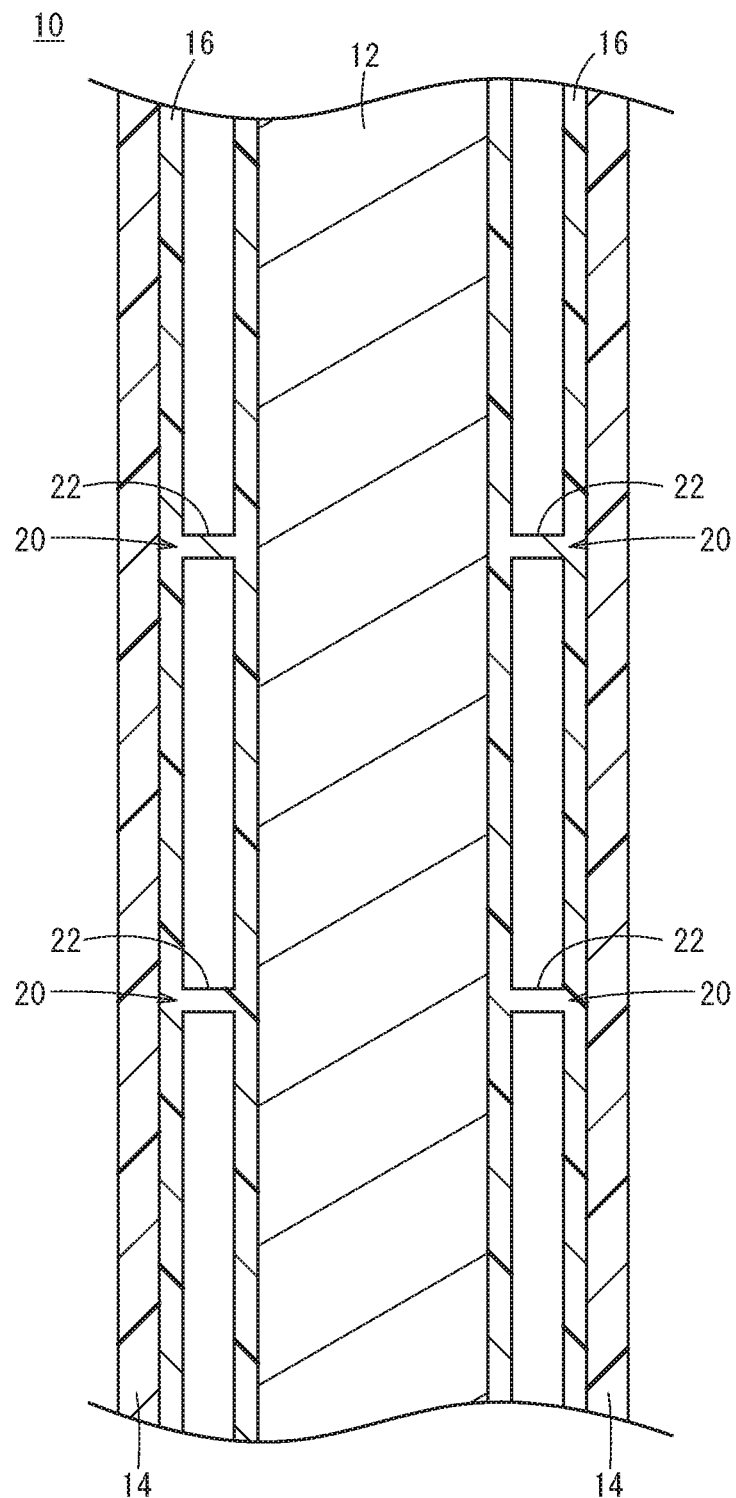
FIG. 3 is a schematic diagram showing a cross section of Modification 1 of the cable.

That is to say, the partitioning portion 20 shown in FIG. 3 has a wall 22 which extends in a direction intersecting the longitudinal direction of the hollow tube 16 and which is joined to the inner circumferential surface of the hollow tube 16. The inner circumferential surface portions of the hollow tube 16 to which the walls 22 are joined, and the inner circumferential surface portions of the hollow tube 16 to which no wall 22 is joined, are positioned in substantially the same plane without difference in level.

The walls 22 of the partitioning portions 20 shown in FIG. 3 are formed, for example, by charging the hollow tube 16 with resin, not cured yet, so that the resin closes the interior of the hollow tube 16 at the partitioning portions 20 and then curing the resin. The resin may be the same material as the hollow tube 16, or may be a different material from the hollow tube 16. Further, the walls 22 shown in FIG. 3 are shaped like plates, but the walls 22 may be formed in other shape.

According to the partitioning portions 20 shown in FIG. 3, partitioning the interior of the hollow tube 16 by the walls 22 enhances flexural strength of the hollow tube 16 while retaining flexibility of the hollow tube 16. This suppresses inflow of the working fluid to the conductor 12 through cracks or the like formed in the hollow tube 16.

In FIG. 3, the inner circumferential surface and the outer circumferential surface of the hollow tube 16 are both not deformed at the partitioning portions 20, but, as in the case of the above-described embodiment, the outer circumferential surface of the hollow tube 16 may be positioned more inward at the partitioning portions 20 than in regions other than the partitioning portions 20. Specifically, for example, grooves etc. can be formed on the outer circumferential surface side of the hollow tube 16 at the partitioning portions 20 so that these portions are located more inward than the outer circumferential surface portions of the hollow tube 16 in regions other than the partitioning portions 20.

Modification 2

Figure 4:
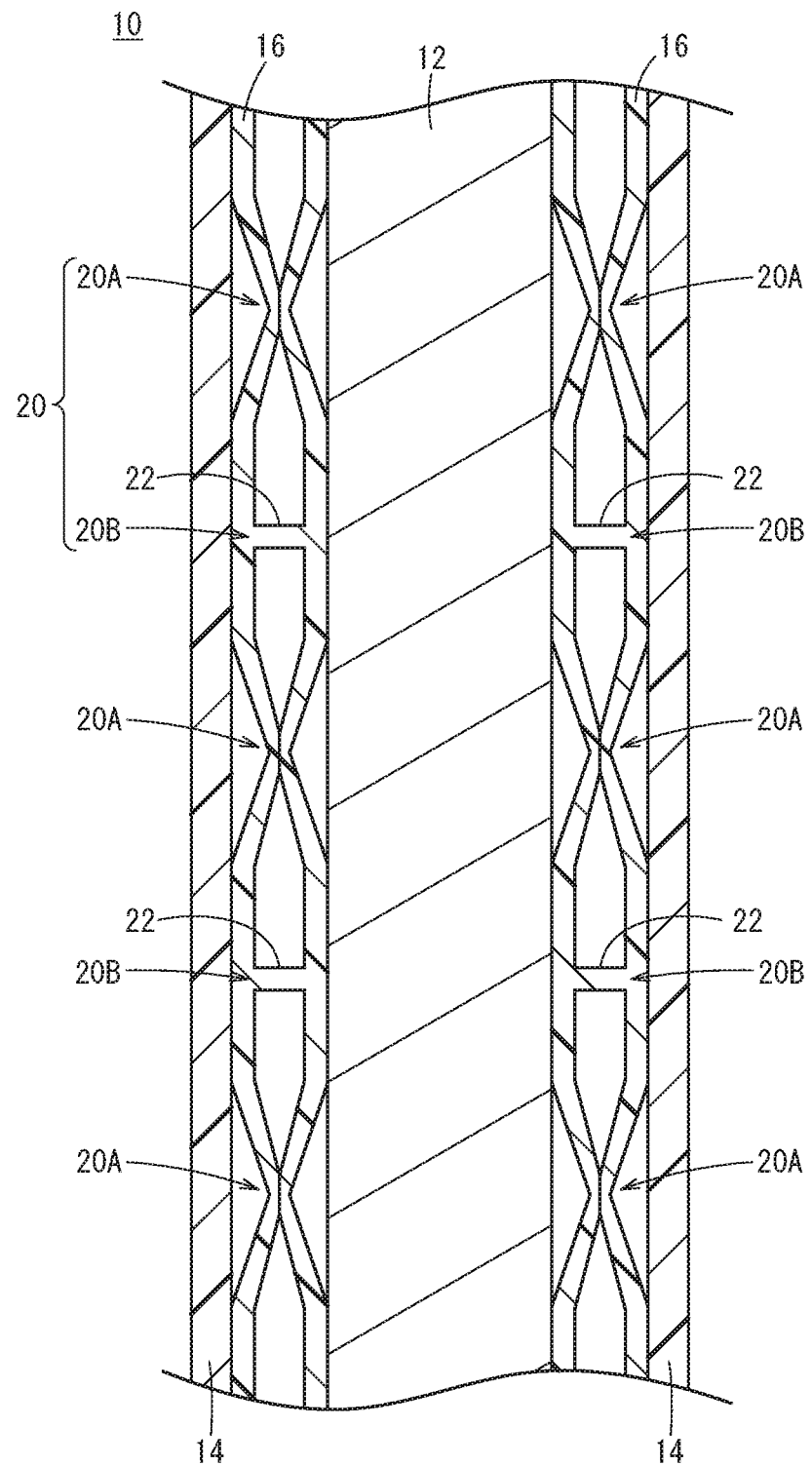
FIG. 4 is a schematic diagram showing a cross section of Modification 2 of the cable.

Further, as shown in FIG. 4, the partitioning portions 20 may include first partitioning portions 20A and second partitioning portions 20B. The first partitioning portions 20A partition the interior of the hollow tube 16 by joining together the inner circumferential surface of the hollow tube 16. The second partitioning portions 20B partition the interior of the hollow tube 16 by the walls 22 joined to the inner circumferential surface of the hollow tube 16 and extending in the direction intersecting the longitudinal direction of the hollow tube 16.

Thus, when the partitioning portions 20 include the first partitioning portions 20A and the second partitioning portions 20B, it is possible to increase the proportion of vacancy inside the tubular protective member 14 and also to enhance flexural strength of the hollow tube 16 while maintaining flexibility of the hollow tube 16.

Modification 3

In the above-described embodiment, a plurality of partitioning portions 20 are provided at intervals in the longitudinal direction of the hollow tube 16, but a single partitioning portion 20 may be provided. However, preferably, a plurality of partitioning portions 20 are provided at intervals in the longitudinal direction of the hollow tube 16.

Modification 4

In the above-described embodiment, the hollow tubes 16 have a substantially circular outer peripheral shape and inner peripheral shape in the cross section taken along the direction orthogonal to the longitudinal direction of the cable 10. However, at least one of the outer peripheral shape and the inner peripheral shape may be other shape than a circle.

Further, in the above-described embodiment, the plurality of hollow tubes 16 have substantially the same outer diameter and inner diameter in the cross section taken along the direction orthogonal to the longitudinal direction of the cable 10. However, all of the plurality of hollow tubes 16 may have different outer diameters, or some of the plurality of hollow tubes 16 may have a different outer diameter from others. In the same way, all of the plurality of hollow tubes 16 may have different inner diameters, or some of the plurality of hollow tubes 16 may have a different inner diameter from others.

Modification 5

In the above-described embodiment, adjacent ones of the plurality of hollow tubes 16 disposed around the conductor 12 are in contact with each other. However, the plurality of hollow tubes 16 may be spaced at intervals around the conductor 12. However, as mentioned above, for the purpose of preventing the tubular protective member 14 from coming in contact with the conductor 12 even when the cable 10 is pressed, it is preferred that adjacent ones of the plurality of hollow tubes 16 are in contact with each other.

Modification 6

Figure 5:
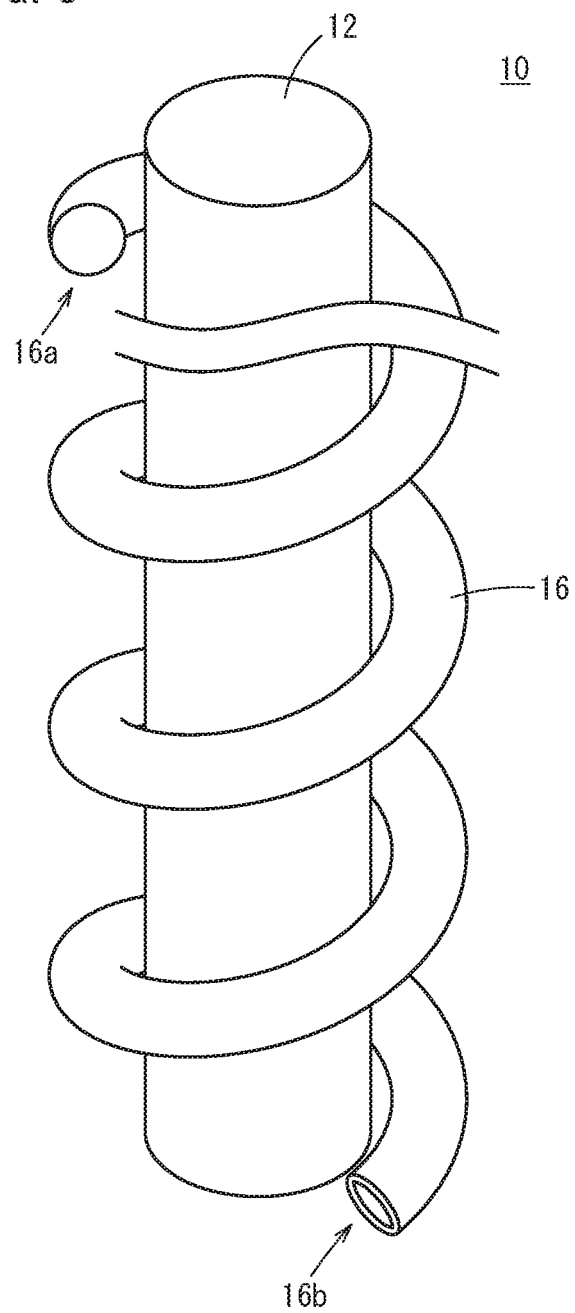
FIG. 5 is a schematic diagram showing Modification 3 of the cable.

In the above-described embodiment, the hollow tubes 16 linearly extend along the longitudinal direction of the conductor 12. However, as shown in FIG. 5, a hollow tube 16 may helically extend along the outer periphery of the conductor 12. This makes it easier to suppress relative positional shift of each hollow tube 16 even when the cable 10 is bent. In order to facilitate understanding, FIG. 5 only shows a single hollow tube 16 and omits the protective member 14.

Modification 7

Further, as shown also in FIG. 5, one end 16a of the ends 16a, 16b of the hollow tube 16 in the longitudinal direction may be closed. Closing one end 16a prevents the working fluid stored in the work pan from getting into the hollow tube 16 even when an end portion of the cable 10 on the one end 16a side is placed inside the work pan of a wire electrical discharge machine. That is, it is preferable that, as one end 16a of the hollow tube 16, the end on the side placed inside the work pan of the wire electrical discharge machine be closed. The other end 16b of the hollow tube 16 on the opposite side to the one end 16a may be closed.

Modification 8

Figure 6:
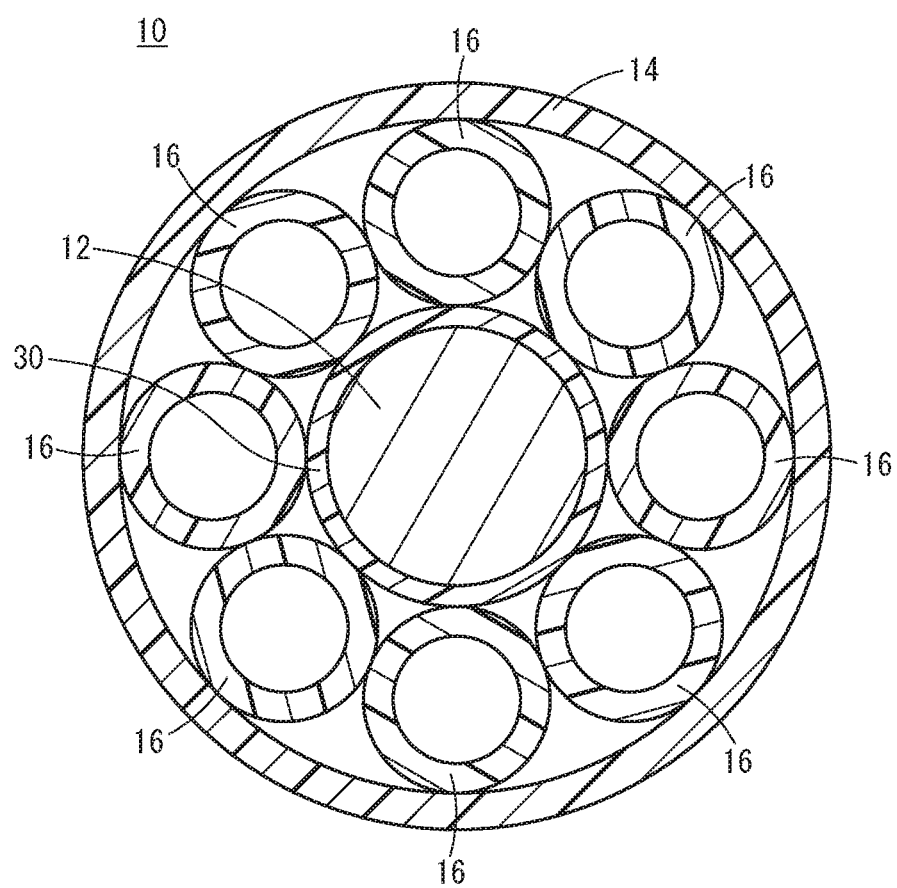
FIG. 6 is a schematic diagram showing a cross section of Modification 4 of the cable.

In the above-described embodiment, the outer periphery of the conductor 12 is not coated. However, as shown in FIG. 6, the conductor 12 may be provided with a coating member 30 made of resin and coating (covering) its periphery. This lengthens the distance between the conductor 12 and the protective member 14 as compared to cases where the coating member 30 is absent. This further reduces the capacitance occurring between the working fluid and the conductor 12.

Modification 9

Figure 7:
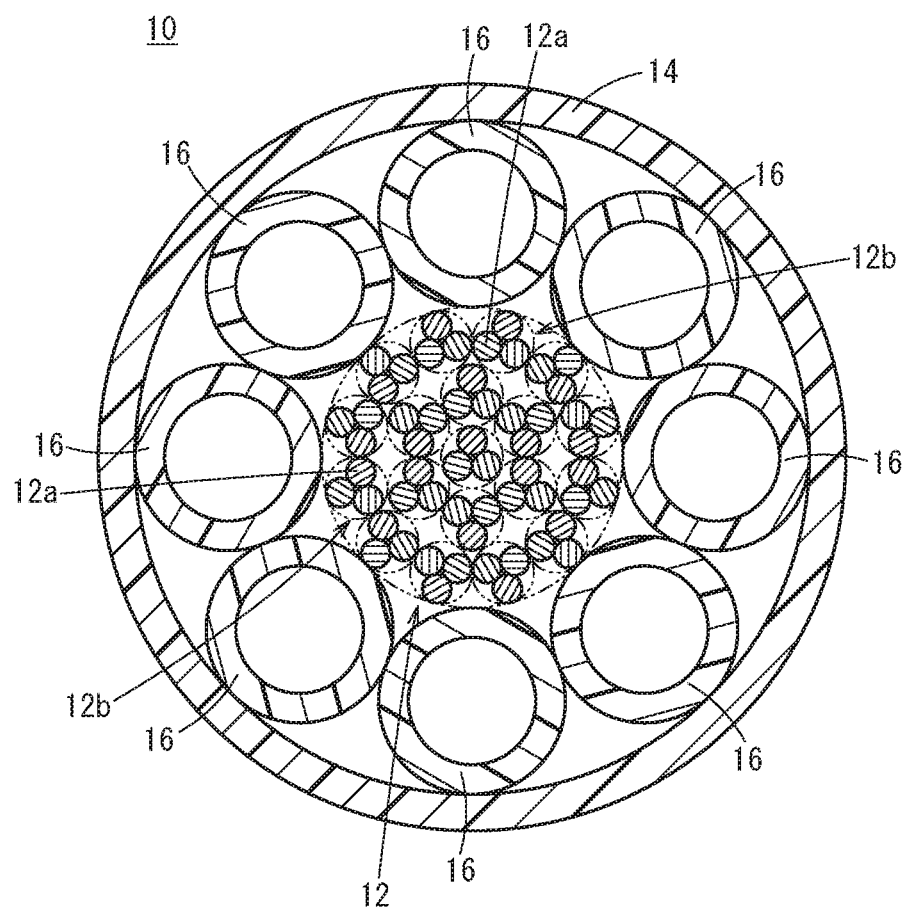
FIG. 7 is a schematic diagram showing a cross section of Modification 5 of the cable.

In the above-described embodiment, the conductor 12 has a form of a single line. However, as shown in FIG. 7, the conductor 12 may be formed by twisting together bundles 12b of a plurality of strands 12a into a rope shape. Then, gaps are formed among the bundles 12b on the outer circumferential side of the conductor 12, and accordingly the proportion of vacancy inside the tubular protective member 14 is increased as compared to cases where the conductor 12 is in the form of a single line. This further reduces the capacitance occurring with the conductor 12. The plurality of strands 12a may be arranged in parallel, or may be twisted together.

Modification 10

Figure 8:
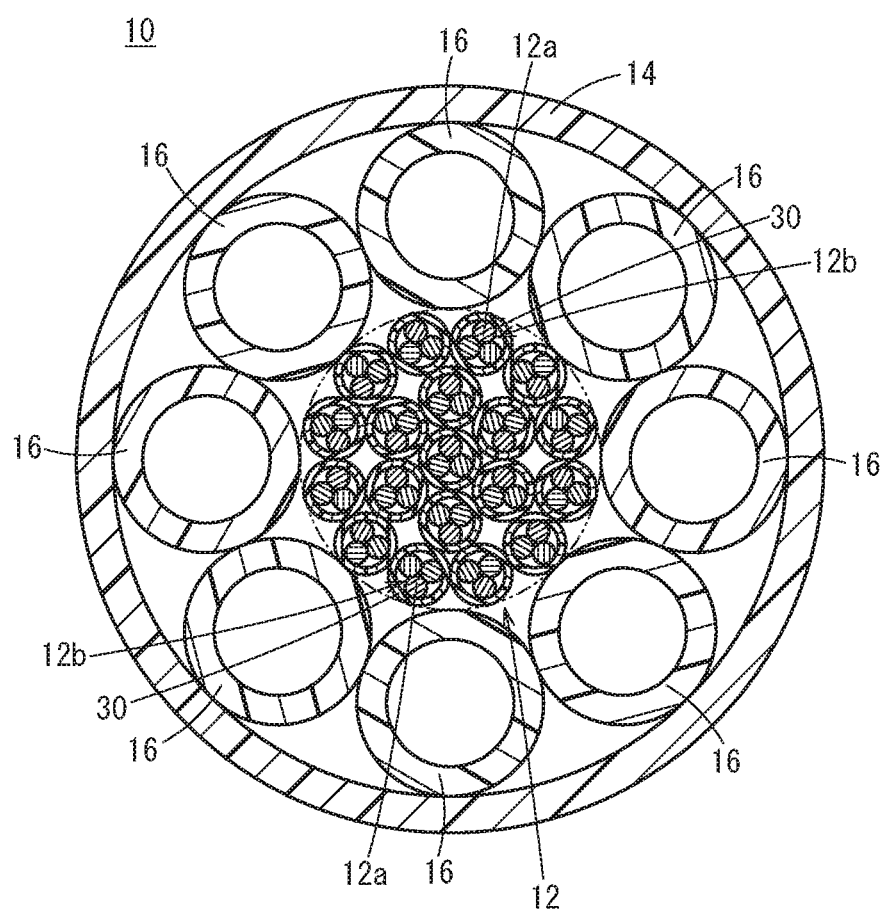
FIG. 8 is a schematic diagram showing a cross section of Modification 6 of the cable.

Further, as shown in FIG. 8, when the conductor 12 is formed by twisting bundles 12b of a plurality of strands 12a into a rope shape, each bundle 12b may be individually coated (covered) with a coating member 30. As in the case described above, this also lengthens the distance between the conductor 12 and the protective member 14 as compared to cases where the coating members 30 are absent. This makes it possible to further reduce the capacitance occurring between the working fluid and conductor 12.

Modification 11

Figure 9:
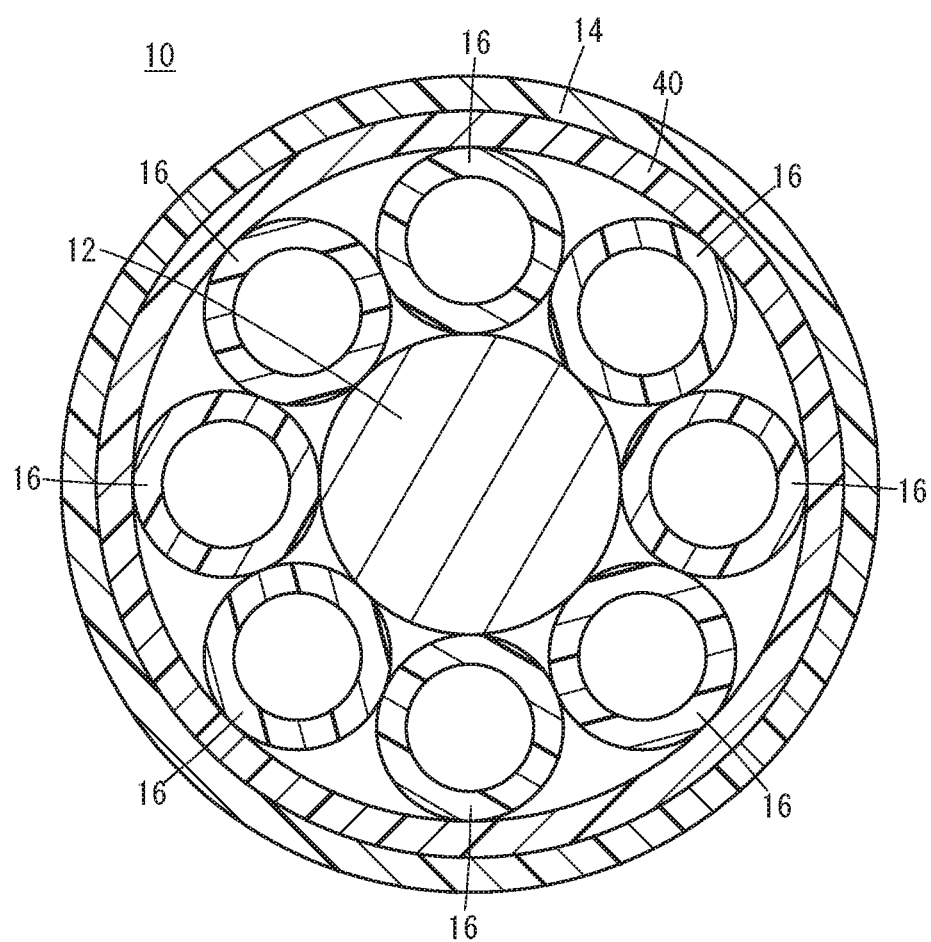
FIG. 9 is a schematic diagram showing a cross section of Modification 7 of the cable.

In the above-described embodiment, the cable 10 is a cable which has the single conductor 12. However, as shown in FIG. 9, the cable 10 may be a coaxial cable which includes the conductor 12 located on the inside of the plurality of hollow tubes 16 and a tubular second conductor 40 located on the outside of the plurality of hollow tubes 16. The second conductor 40 is disposed on the inside of the tubular protective member 14, and the conductor 12 and the plurality of hollow tubes 16 are inserted therein. When the conductor 12 is connected to a wire electrode of a wire electrical discharge machine, the second conductor 40 is connected to a table in the work pan of the wire electrical discharge machine. The table is a table on which a workpiece is placed. When the conductor 12 is connected to the table, the second conductor 40 is connected to the wire electrode. According to such a coaxial cable, the plurality of hollow tubes 16 reduce the capacitance between the conductor 12 and the second conductor 40.

Modification 12

Figure 10:
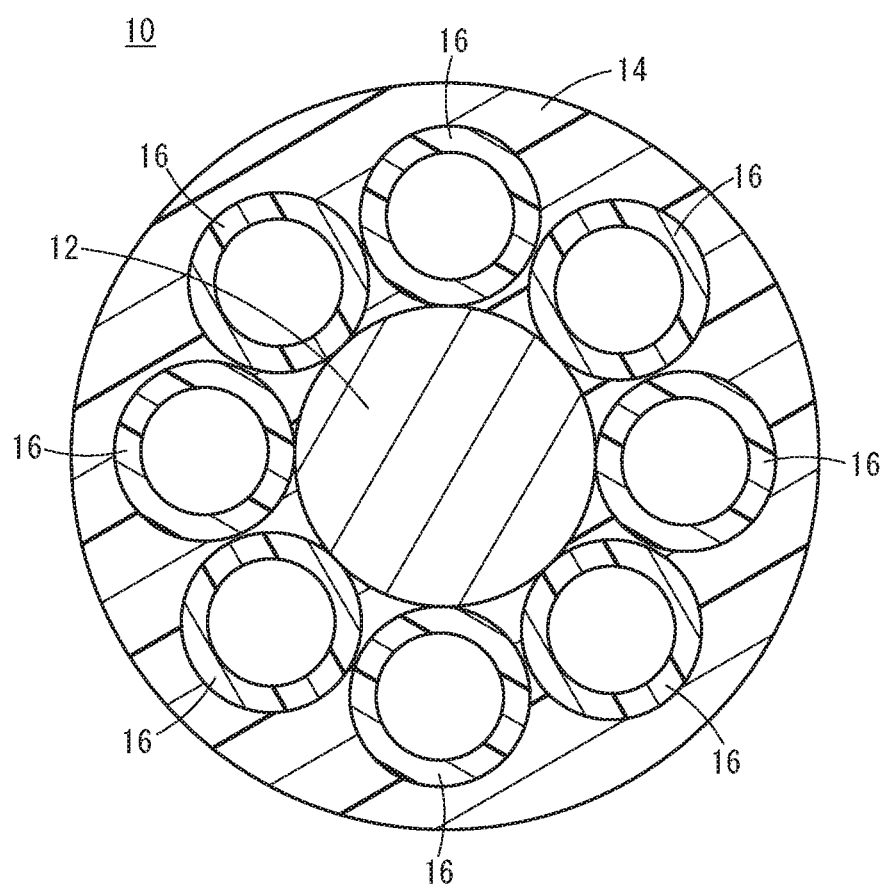
FIG. 10 is a schematic diagram showing a cross section of Modification 8 of the cable.

In the above-described embodiment, the protective member 14 is a tubular member that surrounds the plurality of hollow tubes 16. However, as shown in FIG. 10, the protective member 14 may surround the conductor 12 and the plurality of hollow tubes 16 without leaving any gap. In such a case, the air layer formed around the conductor 12 by the plurality of hollow tubes 16 is formed only inside the hollow tubes 16. As in the case of the above-described embodiment, this also further reduces the capacitance occurring between the working fluid and the conductor 12.

Modification 13

In the above-described embodiment, the cable 10 is placed inside a work pan of a wire electrical discharge machine, but the cable 10 may be disposed inside or outside other equipment. That is to say, the cable 10 may be employed as a feeding cable for supplying electric power to other equipment than a wire electrical discharge machine, or as a signal cable for sending and receiving signals to and from other equipment.

Modification 14

The above-described embodiment and the above-described modifications 1 to 13 may be arbitrarily combined within a range where no contradiction is incurred.

[Technical Ideas]

Technical ideas offered by the embodiment and modifications described above will be described below.

A cable (10) includes a linear conductor (12); a plurality of hollow tubes (16) made of resin and which are disposed around the conductor (12) so that an air layer is formed around the conductor (12), the hollow tubes extending in a longitudinal direction of the conductor (12); an insulating protective member (14) configured to protect the conductor (12) and the plurality of hollow tubes (16); and a partitioning portion (20) provided in at least one hollow tube (16) among the plurality of hollow tubes (16), the partitioning portion being configured to partition an interior of the hollow tube (16).

According to the cable (10), the plurality of hollow tubes (16) form an air layer around the conductor (12), and it is therefore possible to considerably reduce the capacitance occurring with the conductor (12). Further, the partitioning portion (20) is provided in the hollow tube (16) to partition the interior of the hollow tube (16), and thus, even when a dielectric working fluid stored in a work pan of a wire electrical discharge machine enters the hollow tube (16), it is possible to prevent the working fluid from flowing further inward.

An outer circumferential surface portion of the hollow tube (16) at the partitioning portion (20) may be positioned more inward than an outer circumferential surface portion of the hollow tube (16) in a region other than the partitioning portion (20). With this structure, a gap is formed on an outer circumferential side of the hollow tube (16) at the partitioning portion (20), and thus the proportion of vacancy inside the protective member (14) is increased by the formation of the gap. This further reduces the capacitance occurring with the conductor (12).

The partitioning portion (20) may partition the interior of the hollow tube (16) by joining together an inner circumferential surface of the hollow tube (16). With this structure, the partitioning portion (20) can be easily formed by squashing (pressing and deforming) the hollow tube (16).

The partitioning portion (20) may include a wall (22) joined to an inner circumferential surface of the hollow tube (16) and extending in a direction intersecting a longitudinal direction of the hollow tube (16), the wall (22) partitioning the interior of the hollow tube (16). With this structure, it is possible to enhance flexural strength of the hollow tube (16) while retaining flexibility of the hollow tube (16). It is thus possible to suppress inflow of the working fluid to the conductor (12) through a crack or the like formed in the hollow tube (16).

A plurality of the partitioning portions (20) may be provided at intervals in a longitudinal direction of the hollow tube (16). Then, as compared to cases where a single partitioning portion (20) is provided, it is possible to enhance the effect of increasing the proportion of vacancy inside the protective member (14) or the effect of improving flexural strength of the hollow tube (16) while retaining flexibility of the hollow tube (16).

The partitioning portion (20) may include a first partitioning portion (20A) configured to partition the interior of the hollow tube (16) by joining together an inner circumferential surface of the hollow tube (16), and a second partitioning portion (20B) configured to partition the interior of the hollow tube (16) by a wall (22) joined to the inner circumferential surface of the hollow tube (16) and extending in a direction intersecting a longitudinal direction of the hollow tube (16). With this structure, it is possible to increase the proportion of vacancy inside the protective member (14) and also to enhance flexural strength of the hollow tube (16) while retaining flexibility of the hollow tube (16).

Adjacent ones of the plurality of hollow tubes (16) may be in contact with each other. This makes it possible to prevent the protective member (14) from coming into contact with the conductor (12) even when the cable (10) is pressed. Thus, even when the cable (10) is kept in a pressed state, the capacitance occurring with the conductor (12) can be considerably reduced.

The hollow tubes (16) may helically extend along an outer peripheral surface of the conductor (12). This makes it easy to suppress relative positional shift of each hollow tube (16) even when the cable (10) is bent.

At least one end (16a) of the hollow tubes (16) may be closed. With this structure, even when the portion of the cable (10) on the one end (16a) side is placed inside a work pan of a wire electrical discharge machine, it is possible to prevent the working fluid stored in the work pan from getting into the hollow tubes (16).

The cable (10) may further include a resin coating member (30) configured to cover an outer peripheral surface of the conductor (12). Then, the distance between the conductor (12) and the protective member (14) is lengthened as compared to cases where the coating member (30) is absent. This further reduces the capacitance occurring with the conductor (12).

The conductor (12) may be formed by twisting together bundles (12b) of a plurality of strands (12a) into a rope shape. With this structure, gaps are formed among the bundles (12b) on the outer peripheral side of the conductor (12), and accordingly the proportion of vacancy inside the protective member (14) is increased as compared to cases where the conductor (12) is in the form of a single line. This further reduces the capacitance occurring with the conductor (12).

Each of the bundles (12b) may be coated with a coating member (30). With this structure, the distance between the conductor (12) and the protective member (14) is lengthened as compared to cases where the coating member (30) is absent. This further reduces the capacitance occurring with the conductor (12).

The cable (10) may further include a tubular second conductor (40) which is disposed on an inside of the protective member (14) and in which the conductor (12) and the plurality of hollow tubes (16) are inserted. With this structure, the capacitance between the conductor (12) and the second conductor (40) is reduced by the plurality of hollow tubes (16).

The protective member (14) may surround the conductor (12) and the plurality of hollow tubes (16) without leaving a gap, or may be a tubular member surrounding the plurality of hollow tubes (16).

The cable (10) may be placed in an interior of a work pan of a wire electrical discharge machine.

What is claimed is:

1. A cable, comprising:
    a linear conductor;
    a plurality of hollow tubes made of resin and which are disposed around the conductor so that an air layer is formed around the conductor, the hollow tubes extending in a longitudinal direction of the conductor;
    an insulating protective member configured to protect the conductor and the plurality of hollow tubes; and
    a partitioning portion provided in at least one hollow tube among the plurality of hollow tubes, the partitioning portion being configured to partition an interior of the hollow tube.

2. The cable according to claim 1, wherein an outer circumferential surface portion of the hollow tube at the partitioning portion is positioned more inward than an outer circumferential surface portion of the hollow tube in a region other than the partitioning portion.

3. The cable according to claim 1, wherein the partitioning portion partitions the interior of the hollow tube by joining together an inner circumferential surface of the hollow tube.

4. The cable according to claim 1, wherein the partitioning portion includes a wall joined to an inner circumferential surface of the hollow tube and extending in a direction intersecting a longitudinal direction of the hollow tube, the wall partitioning the interior of the hollow tube.

5. The cable according to claim 1, wherein the partitioning portion comprises a plurality of partitioning portions that are provided at intervals in a longitudinal direction of the hollow tube.

6. The cable according to claim 1, wherein the partitioning portion includes a first partitioning portion configured to partition the interior of the hollow tube by joining together an inner circumferential surface of the hollow tube, and a second partitioning portion configured to partition the interior of the hollow tube by a wall joined to the inner circumferential surface of the hollow tube and extending in a direction intersecting a longitudinal direction of the hollow tube.

7. The cable according to claim 1, wherein adjacent ones of the plurality of hollow tubes are in contact with each other.

8. The cable according to claim 1, wherein the hollow tubes helically extend along an outer peripheral surface of the conductor.

9. The cable according to claim 1, wherein at least one end of the hollow tubes is closed.

10. The cable according to claim 1, further comprising a resin coating member configured to cover an outer peripheral surface of the conductor.

11. The cable according to claim 1, wherein the conductor is formed by twisting together bundles of a plurality of strands into a rope shape.

12. The cable according to claim 11, wherein each of the bundles is coated with a coating member made of resin.

13. The cable according to claim 1, further comprising a tubular second conductor which is disposed on an inside of the protective member and in which the conductor and the plurality of hollow tubes are inserted.

14. The cable according to claim 1, wherein the protective member surrounds the conductor and the plurality of hollow tubes without leaving a gap.

15. The cable according to claim 1, wherein the protective member is a tubular member surrounding the plurality of hollow tubes.

16. The cable according to claim 1, wherein the cable is placed in an interior of a work pan of a wire electrical discharge machine.

* * * * *